US005680393A

United States Patent [19]

Bourmeyster et al.

[11] Patent Number: 5,680,393

[45] Date of Patent: Oct. 21, 1997

[54] METHOD AND DEVICE FOR SUPPRESSING BACKGROUND NOISE IN A VOICE SIGNAL AND CORRESPONDING SYSTEM WITH ECHO CANCELLATION

[75] Inventors: Ivan Bourmeyster, Paris; Frédéric Lejay, Pornichet, both of France

[73] Assignee: Alcatel Mobile Phones, Paris, France

[21] Appl. No.: 549,549

[22] Filed: Oct. 27, 1995

[30] Foreign Application Priority Data

Oct. 28, 1994 [FR] France .................................. 94 12964

[51] Int. Cl.[6] .............................. H04M 9/08; H04B 3/20; H04B 1/12; H04B 15/00

[52] U.S. Cl. .......................... 370/286; 379/410; 455/307; 381/71; 367/901

[58] Field of Search ........................ 381/94, 71; 455/307; 367/901; 386/114; 128/901; 370/32.1, 286–292; 379/410, 411

[56] References Cited

U.S. PATENT DOCUMENTS

| | | | |
|---|---|---|---|
| 4,628,529 | 12/1986 | Borth et al. | 381/94 |
| 5,329,587 | 7/1994 | Morgan et al. | 379/410 |
| 5,406,622 | 4/1995 | Silverberg et al. | 379/387 |
| 5,416,847 | 5/1995 | Boze | 381/94 |
| 5,561,667 | 10/1996 | Gerlach | 370/32.1 |

FOREIGN PATENT DOCUMENTS

| | | |
|---|---|---|
| 0438174A3 | 7/1991 | European Pat. Off. . |
| 0556992A1 | 8/1993 | European Pat. Off. . |

OTHER PUBLICATIONS

F. M. Wang et al, "Frequency Domain Adaptive Postfiltering for Enchancement of Noisy Speech", *Speech Communicationi,* vol. 12, No. 1, Mar. 1993, Amsterdam, pp. 41–56.

T. Huhn and H.J. Jentschel, "Kombination von Geruaschreduktion und Echokompensation Beim Freisprechen, " Nachrichtentech Elektron., Berlin 43 6 pp. 274–280 1993.

*Primary Examiner*—Douglas W. Olms
*Assistant Examiner*—Matthew C. Phillips
*Attorney, Agent, or Firm*—Sughrue, Mion, Zinn, Macpeak, and Seas

[57] ABSTRACT

The invention provides a method of suppressing a background noise signal in a sampled noisy voice signal. The method comprises the following steps: digital frequency-domain processing of the noisy voice signal to produce time-domain filtering coefficients, and digital time-domain processing of the noisy voice signal in accordance with the filter coefficients to produce a voice signal in which the background noise signal is substantially suppressed.

6 Claims, 4 Drawing Sheets

METHOD AND DEVICE FOR SUPPRESSING BACKGROUND NOISE IN A VOICE SIGNAL AND CORRESPONDING SYSTEM WITH ECHO CANCELLATION

BACKGROUND OF THE INVENTION

1. Field of the Invention

The present invention concerns methods and devices for suppressing background noise in a voice signal, typically in a hands-free mobile telephone application. It also concerns a system using a device of this kind in combination with echo cancelling.

2. Description of the Prior Art

In a noisy environment, the electrical signal produced by acoustic-electrical conversion of a voice signal is mixed with background noise. If the background noise level is high, as in a vehicle, for example, it is necessary to use signal processing to eliminate the background noise in the electrical voice signal. There are essentially two prior art background noise suppression methods: spectral subtraction and filter banks.

When filter banks are used, as described in patent U.S. Pat. No. 4,628,529, the process includes a step in which the input signal is divided into a plurality of time-domain signals each representative of a respective predetermined frequency band, a step of estimating a signal to noise ratio for each of these time-domain signals, a step of weighting these time signals by means of respective coefficients each of which is dependent on a respective signal to noise ratio for the time-domain signal concerned, and a step of summing these weighted time-domain signals to produce a resultant voice signal in which the background noise signal is suppressed. Each signal to noise ratio is typically estimated according to the variation in the power of the time-domain signal concerned in its respective frequency band. Filter bank processing requires powerful computation means because all the separation, estimation, weighting and summation steps mentioned above are carried out in the time-domain. The computation means available in a mobile telephone are in practise limited, in terms of millions of instructions per second (Mips), by the capacity of the digital signal processor (DSP). It has therefore been proposed to limit the background noise signal suppression processing to coarse frequency bands which reduces the accuracy of the processing.

Spectral subtraction processing operates in the frequency-domain, typically using the Fast Fourier Transform (FFT). Its major drawback is that it causes non-linear distortion in the processed voice signal due to the loss of signal phase information. Spectral subtraction processing causes such distortion because it applies to the samples produced by application of the Fast Fourier Transform to the noisy voice signal to be processed squared modulus functions which eliminate phase information, as a result of which the process is non-linear. Further, this non-linearity of spectral subtraction processing prevents its effective use in conjunction with echo cancellation processing, as proposed by the invention, since the operation of the echo cancelling device is adversely affected by this loss of phase information.

A first objective of the present invention is to provide a method of suppressing background noise in a voice signal which has the advantage of considerably reducing the computation power required, in terms of number of instructions per second, compared to filter bank processing.

A second objective of the invention is to provide a method that does not cause any non-linear distortion of the voice signal to be processed, in contrast with spectral subtraction processing.

Another objective of the invention is to provide a system comprising a background noise suppression device implementing the steps of the method in conjunction with an echo cancelling device.

SUMMARY OF THE INVENTION

The invention consists in a method of suppressing a background noise signal in a sampled noisy voice signal, comprising the following steps:

digital frequency-domain processing of said noisy voice signal to produce time-domain filtering coefficients, and digital time-domain processing of said noisy voice signal in accordance with said filter coefficients to produce a voice signal in which said background noise signal is substantially suppressed.

The method comprises the following digital frequency-domain processing steps for a given processing cycle:

extraction of a plurality of frequency-domain energy components in said noisy voice signal, for each of the extracted frequency-domain energy components, estimation of a ratio between an energy level of the noisy voice signal and an energy level of the background noise signal, determination of a respective gain for each extracted frequency-domain energy component according to said estimated ratio between the energy level of the noisy voice signal and the energy level of the background noise signal for each selected frequency-domain component, and synthesis of said filter coefficients in accordance with said gains.

The step of extraction of frequency-domain energy components preferably comprises the following substeps:

production of K groups each comprising a plurality of frequency-domain components for K respective interleaved blocks of the noisy voice signal, where K is an integer, and calculation of an energy mean of K frequency-domain components of the same rank in the respective K groups to produce a respective extracted frequency-domain energy component.

The calculation step is typically preceded, for each of the K groups of frequency-domain components, by a step of selecting some of the frequency-domain components having respective predetermined ranks in each group, the set of selected frequency-domain components being symmetrical to the counterpart thereof in the plurality of extracted frequency-domain components. Moreover, the production and synthesis steps are respectively implemented by means of Fast Fourier Transformation and Inverse Fourier Transformation.

A device for implementing the method comprises for each successive processing cycle:

means for extracting a plurality of frequency-domain energy components in said noisy voice signal, means for estimating for each of the extracted frequency-domain energy components a ratio between an energy level of the noisy voice signal and an energy level of the background noise signal, means for determining a respective gain for each of said extracted frequency-domain energy components according to said estimated ratio between the energy level of the noisy voice signal and the energy level of the background noise signal for each selected frequency-domain component, means for synthesizing said filter coefficients according to said gains, and means for time-domain filtering of said noisy voice signal in accordance with said filter coefficients to produce a voice signal in which said background noise signal is substantially suppressed.

The invention also provides two variants of a combined echo cancellation and noise suppression system.

A first variant of the system comprises:

a noise suppression device for suppressing a background noise signal in a voice signal to be transmitted to produce a noise suppressed signal, an echo canceller comprising first means for producing an estimated echo signal on the basis of a given voice signal and a difference signal, and second means for subtracting said estimated echo signal from said noise suppressed voice signal to produce said difference signal.

It is characterized in that the background noise suppression device comprises:

digital frequency-domain processing means for processing said voice signal to be transmitted to produce time-domain filtering coefficients, first digital time-domain processing means for processing said voice signal in accordance with said filter coefficients to produce said noise suppressed voice signal in which said background noise signal is substantially suppressed, and second digital time-domain processing means closely similar to said first time-domain processing means for processing a voice signal received from a remote terminal in accordance with said filter coefficients to produce said given voice signal.

A second variant of the system comprises:

an echo canceller comprising first means for producing an estimated echo signal on the basis of a voice signal received from a remote terminal and a difference signal, and second means for subtracting said estimated echo signal from a voice signal to be transmitted to produce said difference signal.

It is characterized in that it further comprises:

a background noise suppression device for suppressing a background noise signal in the difference signal to produce a noise suppressed voice signal, said background noise suppression device comprising:

digital frequency-domain processing means for processing said voice signal to be transmitted to produce time-domain filtering coefficients, and digital time-domain processing means for processing said difference signal in accordance with said filter coefficients to produce a noise suppressed voice signal in which said background noise signal is substantially suppressed.

Other features and advantages of the present invention will emerge more clearly from a reading of the following description with reference to the corresponding appended drawings.

DETAILED DESCRIPTION OF THE PREFERRED EMBODIMENTS

Figure 1:
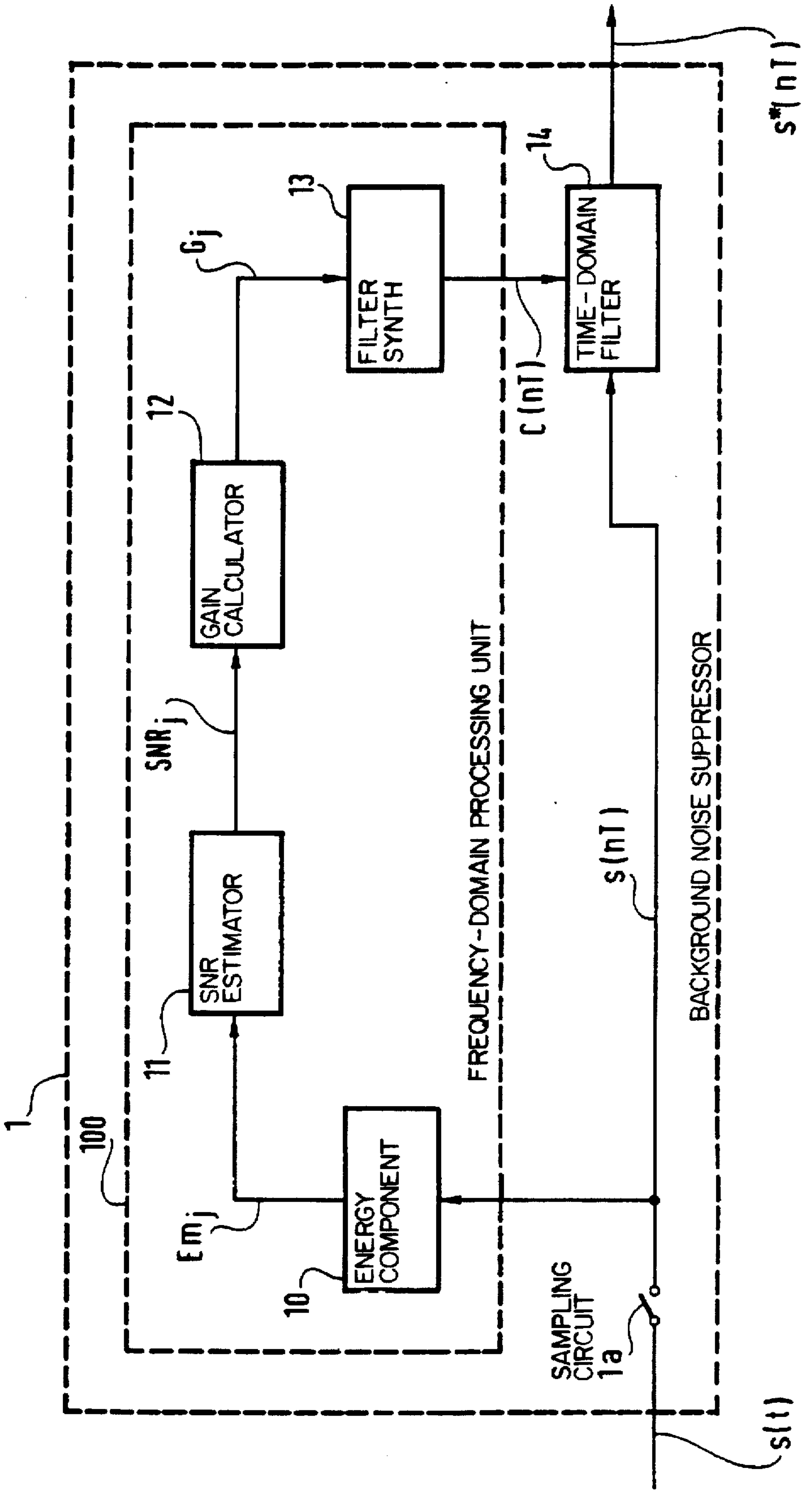
FIG. 1 is a block diagram of a device in accordance with the invention for suppressing background noise in a voice signal.

Referring to FIG. 1, a device 1 in accordance with the invention for suppressing a background noise signal in a voice signal comprises a sampling circuit 1*a*, a frequency-domain processing unit 100 and a time-domain processing circuit 14. The frequency-domain processing unit 100 comprises in cascade an energy component extraction circuit 10, a signal to noise ratio estimation circuit 11, a gain calculation circuit 12 and a filter coefficient synthesis circuit 13. The time-domain processing circuit 14 is a Finite Impulse Response (FIR) time-domain filter.

Figure 2:
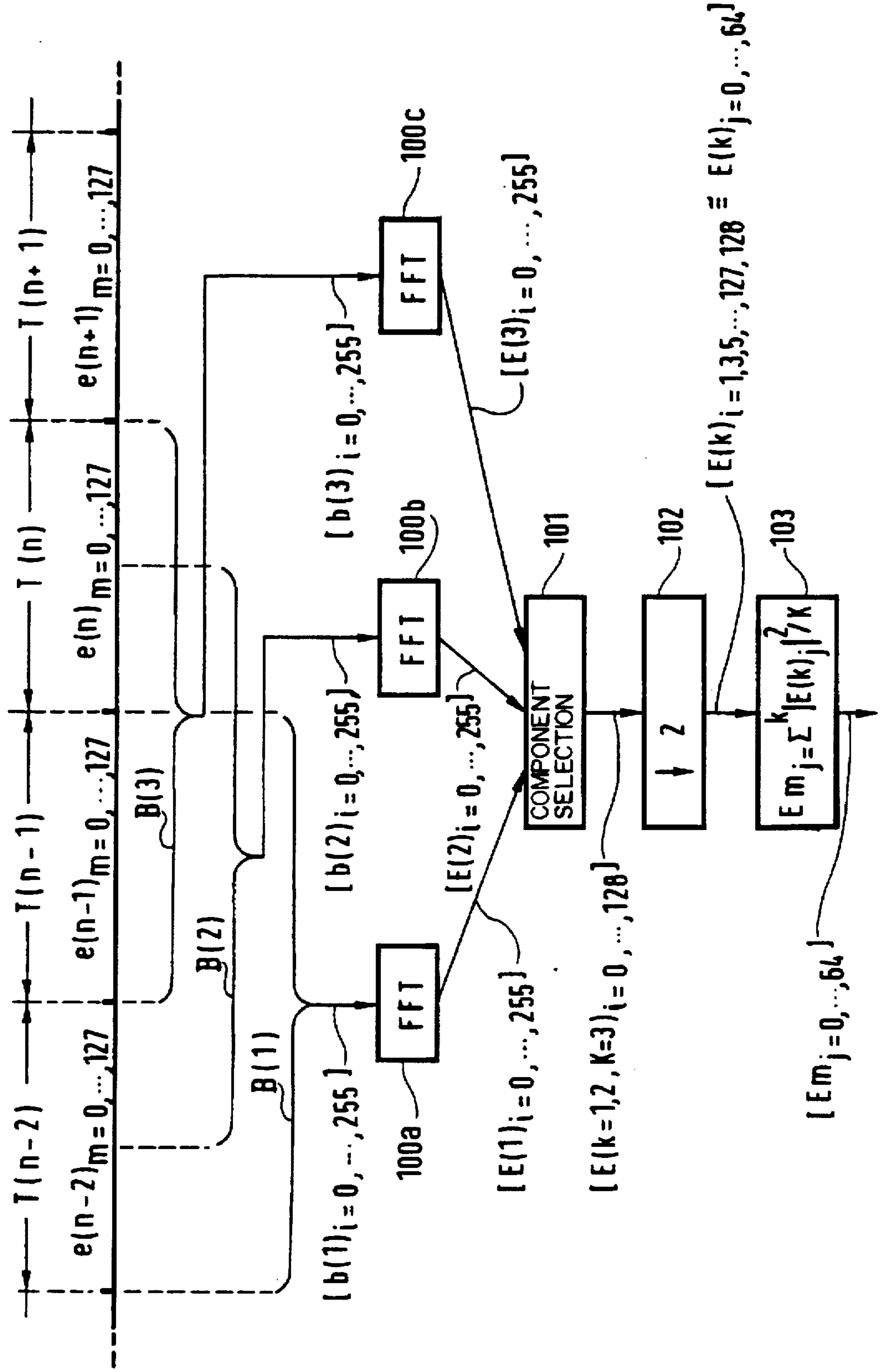
FIG. 2 is a schematic representation of the processing steps implemented in a circuit of the FIG. 1 device.

The sampling circuit 1*a* samples a noisy analog signal s(t) at a frequency F=1/T. This signal consists of a background noise signal added to a voice signal. The noisy sampled voice signal s(nT) produced by the sampling operation is fed to one input of the energy component extraction circuit 10 in the frequency-domain processing unit 100 and to one input of the FIR time-domain filter 14. FIG. 2 is a schematic representation of the processing effected in the circuit 10 receiving the noisy voice signal s(nT). The sampled noisy voice signal s(nT) is in the form of successive frames of samples, four of these frames T(n−2), T(n−1), T(n) and T(n+1) being shown in a first line in FIG. 2. In the embodiment described a frame T(n) is made up of M=128 samples $e(n)_m$, with m varying between 0 and 127. For each frame T(n) associated with a given processing cycle of the method in accordance with the invention an integer number K=3 blocks of samples B(1), B(2) and B(3) are produced. These K=3 blocks of samples are formed in the embodiment described from the frame T(n) and the two frames T(n−2) and T(n−1). The K=3 blocks of samples B(1) through B(3) are interleaved and each comprises 2.M=256 successive samples in frames T(n−2) through T(n), starting from K=3 respective first samples of rank 0 and M/2=64 in frame T(n−2) and of rank 0 in frame T(n−1). The respective groups of 2.M samples $b(1)_i$, $b(2)_i$ and $b(3)_i$, with i varying from 0 to (2.M−1)=255, form the blocks B(1), B(2) and B(3). Three identical Fast Fourier Transforms are applied to the respective groups of samples $b(1)_i$, $b(2)_i$, $b(3)_i$, ($0 \leqq i \leqq 255$), in steps 100*a*, 100*b* and 100*c*. These Fast Fourier Transform steps can be preceded by a time windowing operation. These Fast Fourier Transforms associate with each of the K=3 groups of samples $b(1)_i$, $b(2)_i$ and $b(3)_i$ a respective one of the K=3 groups of frequency-domain components $E(1)_i$, $E(2)_i$ and $E(3)_i$, with i varying from 0 to 255. Step 101 in FIG. 2 simplifies subsequent processing by selecting only some of the frequency-domain components in each group $E(1)_i$ through $E(3)_i$ ($0 \leqq i \leqq 255$). This step is based on the following property: The Fast Fourier Transform of a real signal has pseudo-symmetry. As the samples forming the voice signal are real, each group of frequency-domain components $E(k)_i$ where k=1, 2 or 3 can be written in the form:

$$E(k)_i=\{E(k)_0, E(k)_1, \ldots, E(k)_{127}, E(k)_{128}, E(k)_{129}=E(k)_{127}, \ldots, E(k)_{255}=E(k)_1\} \quad (1)$$

In each group $E(k=1)_i$, $E(k=2)_i$, $E(k=3)_i$ ($0 \leqq i \leqq 255$), the processing step 101 selects some of the constituent frequency-domain components, namely the components $E(k)_0$ through $E(k)_{128}$, which form a selected frequency-domain group. These first 129 selected frequency-domains are sufficient to describe each group $E(k)_i$ ($0 \leqq i \leqq 255$), completely since the other frequency components in the group, namely the last 127 components $E(k)_{129}$ through $E(k)_{255}$ can be deduced by considerations of symmetry. The frequency-domain components $E(k)_0$ through $E(k)_{128}$ selected in each group are symmetrical to the counterparts $E(k)_{129}$ through $E(k)_{255}$ of these components selected from all the frequency-domain components in the group initially produced. The output of processing step 101 therefore comprises the frequency-domain components $E(k)_0$ through $E(k)_{128}$ for each group. In step 102 the 129 frequency-domain component selected in each group are decimated by 2, to retain only one in two components from each selected component group. This decimation by 2 in step 102 selectively discards one component in two relative to a given frequency, to inhibit the interactive effect on that component of each. of the two frequency-domain components at two respective frequencies on either side of said given frequency. In practise, the 65-frequency-domain components $E(k)_i$ retained are those for which i=1, 3, 5, . . . , 127, 128; retaining the frequency-domain component $E(k)_0$ is of no benefit since this is a continuous component. To simplify the notation, these frequency-domain components $E(k)_i$ with i=1, 3, 5, . . . , 127, 128 are denoted $E(k)_j$, with $0 \leqq j \leqq 64$. The result of steps 101 and 102 for each initial group of components $E(1)_i$, $E(2)_i$ and $E(3)_i$ ($0 \leqq i \leqq 255$) is thus a group of selected and decimated components.

Step 103 calculates the energy mean of each triplet of K=3 frequency-domain components of the same rank i in the K=3 groups of frequency components selected and decimated $E(1)_j$, $E(2)_j$ and $E(3)_j$ with i varying from 0 through 64, to produce 65 averaged energy components $Em_j$ with i varying from 0 through 64. This calculation entails squaring the modulus of each frequency-domain component of the same rank i in the K=3 groups of selected and decimated components to produce K=3 energy components and then averaging these K=3 energy components.

Accordingly, for one cycle relating to one frae T(n) of processing the noisy voice signal s(nT), the device 10 extracts 65 energy components $Em_j$, each representative of the energy or power of the noisy voice signal s(nT) for the frequency or band of frequencies concerned. Note that all the steps 100, 101 and 102 described with reference to FIG. 2, although enhancing the method of the invention, can be reduced to a single stage in which a single Fast Fourier Transform is applied to the M=128 samples of the frame T(n) retained for the processing cycle in question. Further, the selection step 101 is optional, and is applied directly to the frequency-domain components produced by the FFT processing.

Referring again to FIG. 1, the 65 energy components $Em_j$ ($0 \leqq j \leqq 64$) are fed to one input of the signal to noise ratio estimation circuit 11. For each of the 65 extracted energy components $Em_j$, the circuit 11 estimates a signal to noise ratio $SNR_j$ between the noisy voice signal s(nT) and a background noise signal included in the noisy voice signal, for the energy component $Em_j$ concerned. This signal to noise ratio is given by the equation:

$$SNR_j^n = Em_j^n / B_j^n \quad (2)$$

in which n is the number of the processing cycle relative to the frame T(n) and $B_j$ is a noise energy component in the energy component $Em_j$.

In practise this estimation of the signal to noise ratio is based on calculating the noise energy component estimated in each given energy component. It uses, for example, the ratio between the extracted energy component $Em_j^n$ and the noise energy component $B_j^{n-1}$ calculated previously during a processing cycle preceding the processing cycle in question which suppresses the noise signal in frame T(n). The higher this ratio, the more it represents the existence of a voice signal for the frequency-domain energy component $Em_j^n$ concerned, in which case the noise component $B_j^{(n-1)}$ calculated in relation to the energy component $Em_j^{(n-1)}$ is maintained in the noise component $B_j^n$. The lower this ratio, the more it represents the fact that the energy component is equivalent to a noise signal, in which case the noise component $B_j^n$ varies by calculation accordingly. The circuit 11 assigns a signal to noise ratio $SNR_j$ ($0 \leqq j \leqq 64$) to each extracted energy component $Em_j$ ($0 \leqq j \leqq 64$) using an estimation algorithm based on this principle. For each of these 65 signal to noise ratios $SNR_j$, the circuit 12 calculates a gain $G_j$ assuming a value substantially between 0 and 1, for example, related directly to the signal to noise ratio $SNR_j$ for the corresponding frequency-domain component. For a given frequency-domain energy component $Em_j$, the higher the ratio $SNR_j$ of the noisy voice signal s(nT) to the noise signal, the lower the gain $G_j$ and the lower the ratio $SNR_j$ of the noisy voice signal to the noise signal, the higher than gain $G_j$. The noise signal component is therefore attenuated for each frequency-domain energy component $Em_j$. The gains $G_j$ are such that the weighting of the respective energy components $Em_j$ by them would give a discrete spectrum of weighted frequency-domain energy components that would be representative of the noisy voice signal s(nT) in which the noise signal is substantially suppressed.

One output of the circuit 12 producing the gains $G_j$ is fed to one input of the filter coefficient synthesis circuit 13. This circuit 13 comprises a first circuit (not shown) for duplicating the 65 gains $G_j$. This circuit receives 65 gains $G_0$, $G_1$, . . . , $G_{64}$ and produces 128 gains that can be written in the form of a group of gains $G_j$ with i between 0 and 127, as follows:

$$G_j = \{G_0, G_1, \ldots, G_{63}, G_{64}, G_{65} = G_{63}, \ldots G_{127} = G_1\}$$

A second circuit (not shown) in the synthesis circuit 13, in the form of an Inverse Fourier Transform $TFD^{-1}$, synthesizes 128 coefficients C(nT) of the filter 14 by Inverse Fourier Transformation of the 128 gains $G_j$. These 128 coefficients C(nT) are fed to a first control input of the filter 14 which is typically an FIR filter. A second input of the filter 14 receives the noisy voice signal s(nT). The filter 14 convolutes the coefficients C(nT) with the 128 samples of the frame T(n) to produce a noise suppressed frame of 128 samples forming part of the noise suppressed voice signal s*(nT). The process applied by the device described above is naturally "adaptive" in the sense that the coefficients C(nT) applied to the control input of the FIR filter 14 are modified for each frame T(n) by the processing steps 10, 11, 12 and 13 carried out on the samples forming the voice signal to be processed.

Summarizing the above, the main feature of the background noise suppression method of the invention is, firstly, its use of digital frequency-domain processing 100 of the noisy voice signal to produce time-domain filter coefficients C(nT) and, secondly, its use of digital time-domain processing 14 of the noisy voice signal s(nT) using the filter coefficients C(nT) to produce a voice signal s*(nT) in which the noise signal is substantially suppressed.

Figure 3:
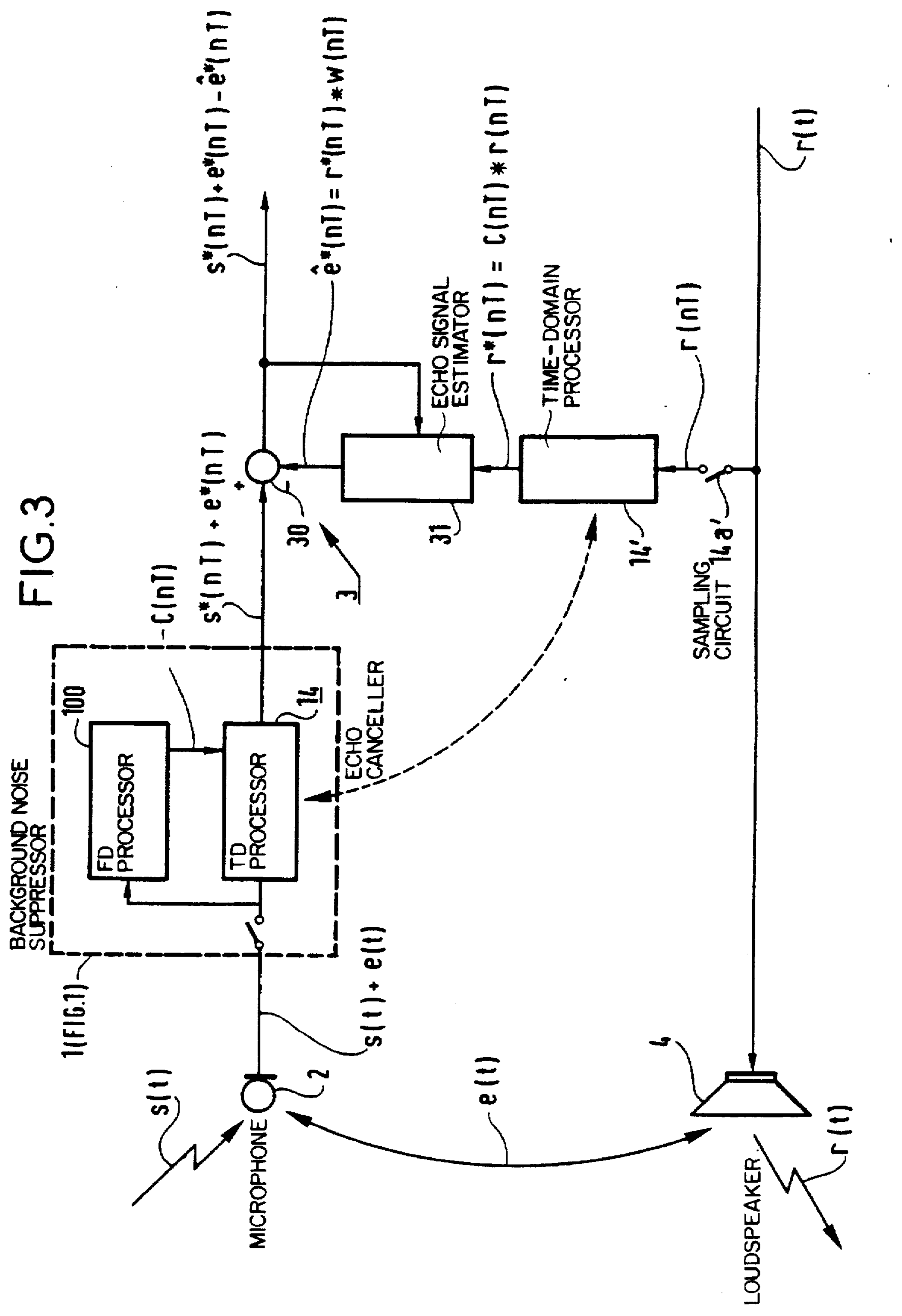
FIG. 3 is a block diagram of a first embodiment in accordance with the invention of a system using the FIG. 1 device in conjunction with echo cancellation.

Referring to FIG. 3, a first embodiment of a combined background noise suppression and echo cancellation system in accordance with the invention is included in a terminal, typically a hands-free mobile telephone, and comprises a microphone 2, a loudspeaker 4, a background noise suppression device 1 of the invention, as described previously, a time-domain processing circuit 14' and an echo canceller 3. The background noise suppression device 1 is identical to the device shown in FIG. 1 and includes a frequency-domain processing unit 100 and a time-domain processing circuit 14. The echo canceller comprises a subtractor 30 and a circuit 31 producing an estimated echo signal. The microphone 2 receives a voice signal [s(t)+e(t)] to be transmitted formed by a noisy sound voice signal s(t) to which is added an echo signal e(t). The echo signal is the result of acoustic coupling between the loudspeaker 4 and the microphone 2. As previously described, the noise suppression device 1 processes the voice signal to be transmitted to produce a noise suppressed transmitted voice signal [s*(nT)+e*(nT)] fed to a first input of the subtractor 30, a second input of which is connected to the output of the circuit 31. A voice signal r(t) received from a remote terminal is fed to one input of the loudspeaker and to one input of the circuit 31 through the time-domain processing circuit 14' preceded by a sampling circuit **14*a*'. An important feature of the invention is that the time-domain processing circuit 14' is at all times closely similar to the time-domain processing circuit 14 in the noise suppression device 1 (FIG. 1). This feature is based on the fact that the estimated echo of the received signal r(t) produced by the circuit 31 is to be subtracted by the subtractor 30** from the echo signal e*(nT) processed by the background noise suppression circuit 1 rather than the original echo signal e(nT). This circuit 14' is purely and simply a duplicate of the time-domain processing circuit 14 in the device 1, as indicated by the double-headed dashed line arrow in FIG. 3. The time-domain processing circuit 14' is therefore associated at all times with the same 128 filter coefficients C(nT) as the circuit 14 in the device 1. It processes the received voice signal r(t) to produce a noise suppressed received voice signal r*(nT). This processing entails convolution of the coefficients C(nT) and the samples r(nT) of the received signal r(t) in cycles of 128. The circuit 31 produces an estimate ê*(nT) of the noise suppressed echo signal e*(nT) from the noise suppressed received voice signal r*(nT) and echo cancellation coefficients w(nT). At the output of the subtractor 30 there is therefore obtained a difference signal [s*(nT)+e*(nT)−ê*(nT)] in which the echo signal is substantially suppressed. The echo cancellation coefficients w(nT) are obtained from this difference signal.

Figure 4:
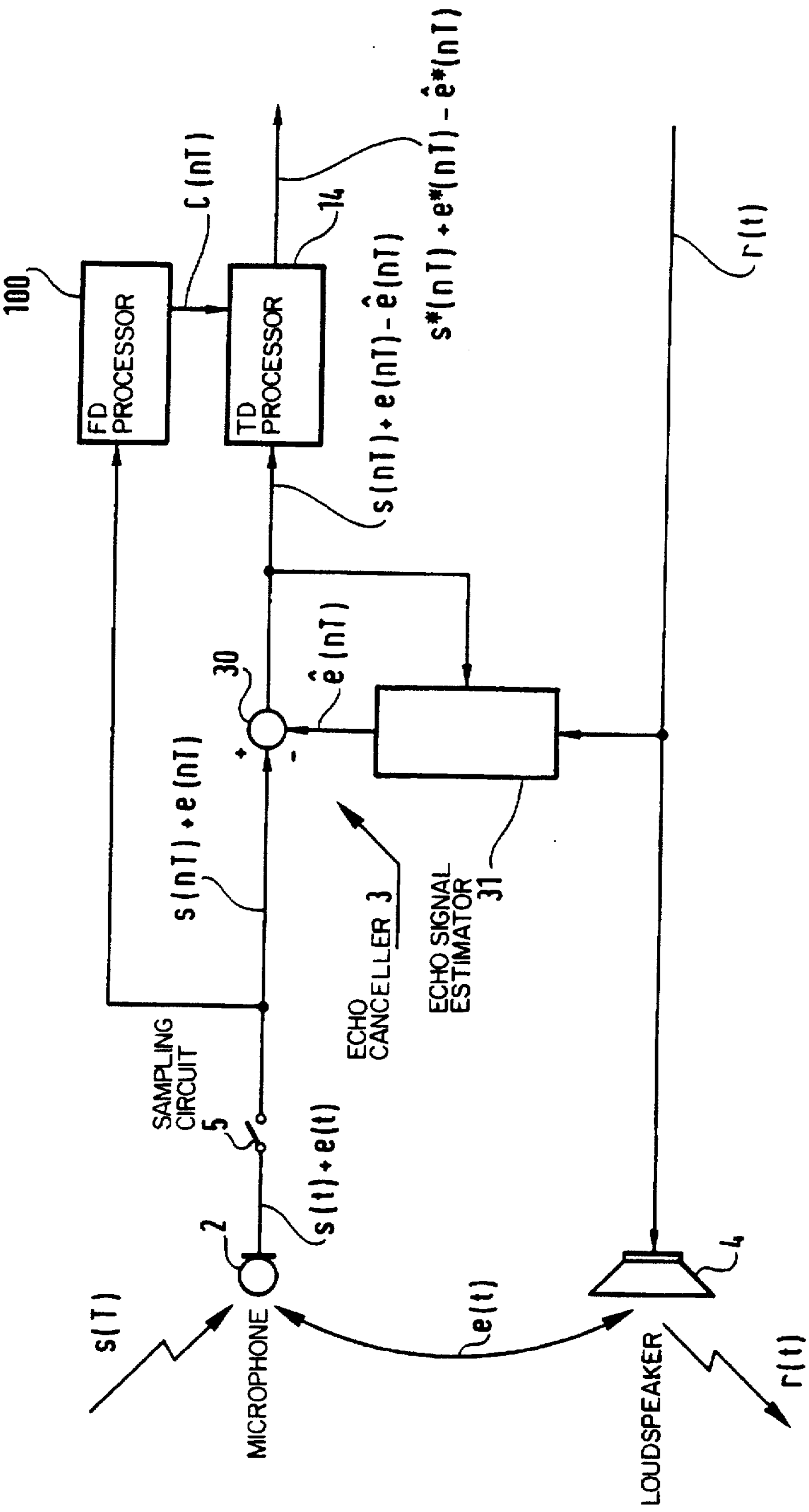
FIG. 4 is a block diagram of a second embodiment in accordance with the invention of a system using the FIG. 1 device in conjunction with echo cancellation.

Referring to FIG. 4, a second embodiment of a combined noise suppression and echo cancellation system of the invention comprises a microphone 2, a loudspeaker 4, an echo canceller 3, a frequency-domain processing unit 100, a time-domain processing circuit 14 and a sampling circuit 5. The unit 100 and the circuit 14 are identical to those described in FIG. 1. The echo canceller 3 comprises a subtractor 30 and a circuit 31 which produces an estimated echo signal ê(nT). The microphone 2 receives a transmitted voice signal [s(t)+e(t)] comprising a noisy sound voice signal s(t) to which an echo signal e(t) is added. The echo signal is the result of acoustic coupling between the loudspeaker 4 and the microphone 2. The transmitted voice signal [s(t)+e(t)] is sampled in the sampling circuit 5 to produce the signal [s(nT)+e(nT)]. The sampled signal is fed to an input of the unit 100 and to an input of the circuit 14 through the subtractor 30. A voice signal r(t) received from a remote terminal is fed to an input of the circuit 31 and to an input of the loudspeaker 4. The circuit 31 produces in response to the signal r(t) an estimated echo signal ê(nT) fed to a first input of the subtractor 30, a second input of which receives the transmitted voice signal [s(nT)+e(nT)]. A difference signal [s(nT)+e(nT)−ê(nT)] fed to the circuit 14 is produced at the output of the subtractor 30. In this embodiment, the frequency-domain processing effected in the unit 100 is applied to the transmitted voice signal [s(nT)+e(nT)] and the time-domain processing in the circuit 14, on the basis of the coefficients C(nT) produced by the unit 100, is applied to the difference signal or the transmitted voice signal [s(nT)+e(nT)−ê(nT)] processed by echo cancellation. This embodiment avoids "duplication" of the circuit 14 in the branch including the circuit 31, as shown for the previous embodiment by the dashed line arrow in FIG. 3.

There is claimed:

1. Method of suppressing a background noise signal in a sampled noisy voice signal, comprising the following steps:
   - digital frequency-domain processing of said noisy voice signal to produce time-domain filtering coefficients, and
   - digital time-domain processing of said noisy voice signal in accordance with said filtering coefficients to produce a voice signal in which said background noise signal is substantially suppressed,
   - the digital frequency-domain processing step for a given processing cycle comprising the steps of:
   - extracting a plurality of frequency-domain energy components in said noisy voice signal by producing K groups, each comprising a plurality of frequency-domain components, for K respective interleaved blocks of said noisy voice signal, where K is an integer, and calculating an energy mean of K frequency-domain components of the same rank in the respective K groups to produce a respective extracted frequency-domain energy component,
   - for each of said extracted frequency-domain energy components, estimating a ratio between an energy level of said noisy voice signal and an energy level of said background noise signal,
   - determining a respective gain for each extracted frequency-domain energy component according to said estimated ratio between the energy level of said noisy voice signal and the energy level of said background noise signal for each selected frequency-domain component, and;
   - synthesizing said filtering coefficients in accordance with said gains.

2. Method according to claim 1, wherein said calculation step is preceded, for each of said K groups of frequency-domain components, by a step of selecting some of said frequency-domain components having respective predetermined ranks in each group, the set of selected frequency-domain components being symmetrical to non-selected frequency-domain components in the plurality of extracted frequency-domain components.

3. Method according to claim 1, wherein said extracting and synthesizing steps are respectively implemented by means of Fast Fourier Transformation and Inverse Fourier Transformation.

4. Combined echo cancellation and background noise suppression system comprising:
   - a noise suppression device for suppressing a background noise signal in a voice signal to be transmitted to produce a noise suppressed signal,
   - an echo canceller comprising first means for producing an estimated echo signal on the basis of a given voice signal and a difference signal, and second means for subtracting said estimated echo signal from said noise suppressed voice signal to produce said difference signal,
   - wherein said noise suppression device comprises:
   - digital frequency-domain processing means for processing said voice signal to be transmitted to produce time-domain filtering coefficients, first digital time-domain processing means for processing said voice signal to be transmitted in accordance with said filtering coefficients to produce said noise suppressed voice signal in which said noise signal is substantially suppressed, and second digital time-domain processing means for processing a voice signal received from a remote terminal in accordance with said filtering coefficients to produce said given voice signal.

5. Combined echo cancellation and background noise suppression system for a voice signal to be transmitted, comprising:

an echo canceller comprising first means for producing an estimated echo signal on the basis of a voice signal received from a remote terminal and a difference signal, and second means for subtracting said estimated echo signal from said voice signal to be transmitted to produce said difference signal, a background noise suppression device for suppressing a background noise signal in said difference signal to produce a noise suppressed voice signal, said background noise suppression device comprising:

digital frequency-domain processing means for processing said voice signal to be transmitted to produce time-domain filtering coefficients, and digital time-domain processing means for processing said difference signal in accordance with said filter coefficients to produce a noise suppressed voice signal in which said background noise signal is substantially suppressed.

6. The combination according to claim 5, wherein said digital frequency-domain processing means comprises means for extracting a plurality of frequency-domain energy components in said voice signal, said means for extracting producing K groups, each comprising a plurality of frequency-domain components, for K respective interleaved blocks of said voice signal, where K is an integer, and calculating an energy mean of K frequency-domain components of the same rank in the respective K groups to produce a respective extracted frequency-domain energy component.

* * * * *